(12) United States Patent
Cypher et al.

(10) Patent No.: US 7,917,698 B2
(45) Date of Patent: Mar. 29, 2011

(54) METHOD AND APPARATUS FOR TRACKING LOAD-MARKS AND STORE-MARKS ON CACHE LINES

(75) Inventors: Robert E. Cypher, Saratoga, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 741 days.

(21) Appl. No.: 11/924,742

(22) Filed: Oct. 26, 2007

(65) Prior Publication Data
US 2009/0113131 A1    Apr. 30, 2009

(51) Int. Cl.
G06F 12/08    (2006.01)
G06F 12/00    (2006.01)

(52) U.S. Cl. . 711/118; 711/108; 711/121; 711/E12.001; 711/E12.04; 711/E12.02

(58) Field of Classification Search ............ 711/118
See application file for complete search history.

(56) References Cited

U.S. PATENT DOCUMENTS

| | | | | |
|---|---|---|---|---|
| 6,463,522 | B1 * | 10/2002 | Akkary | 712/216 |
| 7,206,903 | B1 * | 4/2007 | Moir et al. | 711/145 |
| 7,484,080 | B2 * | 1/2009 | Chaudhry et al. | 712/225 |
| 2004/0162951 | A1 * | 8/2004 | Jacobson et al. | 711/143 |

* cited by examiner

*Primary Examiner* — Mardochee Chery
(74) *Attorney, Agent, or Firm* — Park, Vaughan, Fleming & Dowler LLP; Anthony P. Jones

(57) ABSTRACT

Embodiments of the present invention provide a system that handles load-marked and store-marked cache lines. Upon asserting a load-mark or a store-mark for a cache line during a given phase of operation, the system adds an entry to a private buffer and in doing so uses an address of the cache line as a key for the entry in the private buffer. The system also updates the entry in the private buffer with information about the load-mark or store-mark and uses pointers for the entry and for the last entry added to the private buffer to add the entry to a sequence of private buffer entries placed during the phase of operation. The system then uses the entries in the private buffer to remove the load-marks and store-marks from cache lines when the phase of operation is completed.

23 Claims, 13 Drawing Sheets

METHOD AND APPARATUS FOR TRACKING LOAD-MARKS AND STORE-MARKS ON CACHE LINES

BACKGROUND

1. Field of the Invention

Embodiments of the present invention relate to techniques for marking cache lines. More specifically, embodiments of the present invention relate to a technique for tracking load-marks and store-marks on cache lines to prevent interfering accesses by other threads.

2. Related Art

Some computer systems have been designed to place load-marks and/or store-marks on cache lines that are accessed by a thread (also called a "strand") to prevent interfering accesses to the cache line by other threads. For example, if a thread needs to ensure that it can read from a cache line without another thread storing a value to the cache line, the thread can place a load-mark on the cache line to prevent another thread from storing a value to the cache line. The load-marking process is described in more detail in U.S. patent application Ser. No. 11/591,225, entitled "Facilitating Load Reordering through Cacheline Marking," by inventors Robert Cypher and Shailender Chaudhry. Similarly, the process of placing store-marks on cache lines to prevent subsequent interfering accesses to the cache lines is described in more detail in U.S. patent application Ser. No. 11/591,223, entitled "Facilitating Store Reordering through Cacheline Marking," by inventors Robert E. Cypher and Shailender Chaudhry.

In some of these systems, a thread is limited to placing one load-mark and/or store-mark on a given cache line. Hence, the thread must remove any existing marks from the cache line before placing any subsequent marks on the cache line. In addition, the system is required to remove marks from cache lines when the marks are no longer needed. For example, the thread must remove load-marks and/or store-marks from cache lines after completing a "phase of operation" wherein related load-marks and/or store marks are placed on cache lines.

Some systems use a private buffer to keep track of the addresses of cache lines that a thread has marked. In these systems, when a cache line is load-marked and/or store-marked, an entry is added to a private buffer for the thread, wherein the entry includes information about the load-mark or store-mark such as the address of the cache line where the load-mark and/or store-mark was placed.

While removing load-marks and/or store-marks from cache lines, the system examines the entries in the private buffer to identify the cache lines from which load-marks and/or store-marks must be removed. After removing the mark(s) from a given cache line, the thread removes the associated entry from the private buffer.

In some systems, threads quickly transition between different phases of operation, which for example can be different transactions. In these systems, thread performance can be hampered by the requirement that the system remove load-marks and store-marks for the thread after each phase of operation. For example, if the system is still using the entries in the private buffer to remove load-marks and/or store-marks from a preceding phase of operation, the system may not be able to place entries for newly marked cache lines into the private buffer. Consequently, the system may not be able to place load-marks and/or store-marks on cache lines for the thread, which can impede the performance of the thread.

Hence, what is needed is a system that supports load-marking and store-marking of cache lines without the above-described problems.

SUMMARY

Embodiments of the present invention provide a system that handles load-marked and store-marked cache lines. Upon asserting a load-mark or a store-mark for a cache line during a first phase of operation, the system adds a new entry to a private buffer and in doing so uses an address of the cache line as a key for the entry in the private buffer. When adding the new entry to the private buffer, the system sets a phase indicator in the entry in the private buffer to indicate the first phase of operation. If the entry is a first entry in the private buffer for the first phase of operation, the system updates a prev pointer in the entry to null; otherwise, the system updates the prev pointer in the entry to point to an entry in the private buffer pointed to by a last pointer for the first phase of operation. The system then updates the last pointer for the first phase of operation to point to the entry in the private buffer.

In some embodiments, upon asserting a store-mark in metadata associated with the cache line, the system updates a bit mask in the entry to indicate a portion of the cache line being stored to by a corresponding store operation that is buffered into a store queue.

In some embodiments, the system completes the first phase of operation and commences a second phase of operation. Upon marking a cache line by asserting a store-mark in metadata associated with the cache line during the second phase of operation, the system adds an entry to the private buffer and in doing so uses the address of the cache line as the key for the entry in the private buffer. When adding the entry to the private buffer, the system sets the phase indicator in the entry in the private buffer to indicate the second phase of operation. If the entry is newly added to the private buffer and if the entry is the first entry in the private buffer for the second phase of operation, the system sets the prev pointer in the entry to null. Otherwise, if the entry is newly added to the private buffer and if the entry is not the first entry in the private buffer for the second phase of operation, the system updates the prev pointer in the entry to point to an entry in the private buffer pointed to by a last pointer for the second phase of operation. The system then updates the last pointer associated with the second phase of operation to point to the entry in the private buffer.

In some embodiments, the system records a type of mark asserted for the cache line in a mark-type field in the entry.

In some embodiments, the system completes the first phase of operation and commences a second phase of operation. Upon marking a cache line by asserting a load-mark or a store-mark in metadata associated with the cache line during the second phase of operation, the system adds an entry to the private buffer and in doing so uses the address of the cache line as the key for the entry in the private buffer. When adding the entry to the private buffer, the system sets the phase indicator in the entry in the private buffer to indicate the second phase of operation. If the entry is newly added to the private buffer and if the entry is the first entry in the private buffer for the second phase of operation, the system sets the prev pointer in the entry to null. Otherwise, if the entry is newly added to the private buffer and if the entry is not the first entry in the private buffer for the second phase of operation, the system updates the prev pointer in the entry to point to an entry in the private buffer pointed to by a last pointer for the second phase of operation. The system then updates the last pointer associated with the second phase of operation to point to the entry in the private buffer.

In some embodiments, upon completing the first phase of operation and commencing the second phase of operation, starting at the entry in the private buffer indicated by the last pointer associated with the first phase of operation, the system uses the prev pointer in each entry to traverse through the sequence of entries added to the private buffer during the first phase of operation. While traversing the sequence of entries, the system determines if the phase indicator for each entry indicates the first phase of operation. If so, the system removes the entry from the private buffer. Otherwise, the system adds the entry to a sequence of entries associated with the second phase of operation.

In some embodiments, when adding the entry to a sequence of entries associated with the second phase of operation, if the entry is a first entry in the private buffer for the second phase of operation, the system sets a prev pointer in the entry to null, otherwise, the system sets the prev pointer in the entry to point to a entry in the private buffer pointed to by a last pointer for the second phase of operation. The system then updates the last pointer for the second phase of operation to point to the entry in the private buffer.

In some embodiments, when removing each entry from the private buffer, the system removes any load-mark and store-mark from the associated cache line and deletes the entry from the private buffer.

In some embodiments, while removing a store-mark from a cache line, the system uses the bit mask associated with the entry in the private buffer to identify portions of an entry in a store queue that are to be stored to the cache line and uses the identified portions to complete the store from the store queue to the cache line.

In some embodiments, the private buffer is organized as a content-addressable memory (CAM).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention use a content-addressable memory (CAM) to maintain a dynamic record of the set of cache lines on which a given execution thread (or strand) has placed load-marks or store-marks. Many different implementations of CAMs are known in the art and are therefore not described. However, in some embodiments of the present invention, the CAM is implemented as described in U.S. patent application Ser. No. 11/495,852, entitled "Content-Addressable Memory that Supports a Priority Ordering between Banks," by inventor Robert Cypher and as described in U.S. patent application Ser. No. 11/495,451, entitled "Content-Addressable Memory that Supports a Priority Ordering between Banks of Differing Sizes" by inventor Robert Cypher.

Some embodiments of the present invention include a pointer in each entry in the CAM. The pointers facilitate the creation of a record of a sequence of valid entries within the CAM.

Some embodiments of the present invention include a phase indicator in each entry in the CAM and a phase flag for each thread. The phase indicators and phase flag facilitate adding new entries to the CAM while old entries are being removed (e.g., adding entries to the CAM during one phase of operation while the entries from a prior completed phase of operation are being removed).

Some embodiments of the present invention include a bit mask in each entry in the CAM. The bit mask facilitates keeping track of the portions of a cache line for which the store queue holds a buffered store.

Note that for the purposes of illustration we assume that a cache line is 64 bytes (or eight 8-byte doublewords) in length. In addition, we describe a bit mask and other elements of embodiments of the present invention using doubleword resolution (e.g., the bit mask tracks outstanding stores to each doubleword in the cache line). However, alternative embodiments can work with longer or shorter cache lines and higher or lower resolutions. For example, in one higher-resolution embodiment, the bit mask could include a bit for each byte in a 128-byte cache line.

Computer System

Figure 1:
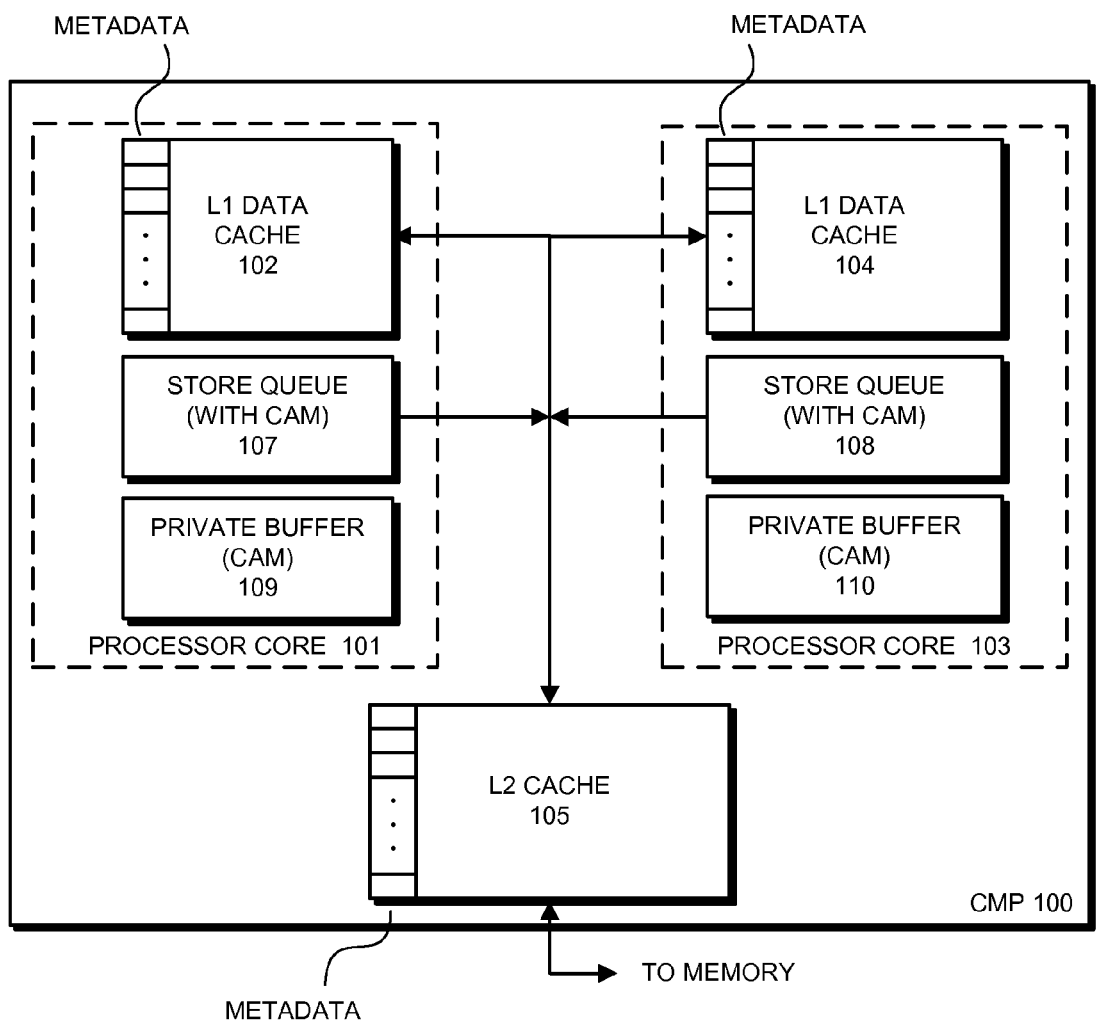
FIG. 1 illustrates an exemplary Chip Multi-Processor (CMP) system in accordance with embodiments of the present invention.

FIG. 1 illustrates an exemplary Chip Multi-Processor (CMP) 100 in accordance with embodiments of the present invention. CMP 100 is incorporated onto a single semiconductor die, and includes two processor cores, 101 and 103. Each processor core 101 and 103 is a separate processing unit that performs computational operations. Each processor core 101 and 103 uses one or more execution threads (or strands) to perform computational operations. Performing computational operations using execution threads is known in the art and is therefore not described in more detail. For the purposes of illustration, in the following description we describe operations as being "performed" by threads when in actuality the processor cores execute the instructions that perform the operations.

In some embodiments of the present invention, CMP 100 is part of a computer system. Within the computer system, CMP 100 can be coupled to devices such as video cards, network cards, optical drives, and other peripheral devices using a bus, a network, or another suitable interface.

Processor cores 101 and 103 include L1 data caches 102 and 104, respectively, and they share L2 cache 105. The data caches store instructions and data for processor cores 101 and 103. Along with L1 data caches 102 and 104, processor cores 101 and 103 include store queues 107 and 108, which buffer pending store operations.

During a store operation, processor core 101 first performs a lookup for a corresponding cache line in L1 data cache 102. If the lookup generates a hit in the L1 data cache 102, processor core 101 allocates an entry for the store in store queue 107. However, if the lookup generates a miss in L1 data cache 102, processor core 101 allocates an entry for the store in store queue 107 and sends a corresponding fetch for the store to L2 cache 105. If the fetch for the store misses in the L2 cache (i.e., the cache line is not present in the L2 cache), the memory system can fetch the cache line from memory (e.g., from disk).

During a subsequent load operation, processor core 101 uses store queue 107 to locate completed but not-yet-retired stores to the same address that are logically earlier in program order. For each byte being read by the load operation, if such a corresponding store exists, the load operation obtains its value from store queue 107 rather than from the memory subsystem.

Cache lines contained in L1 data caches 102 and 104, L2 cache 105 include "load-marks" and "store-marks" in metadata associated with the cache line. A thread (or a processor) can place a load-mark or a store-mark on a cache line by asserting the load- or store-mark in the metadata for the cache line. When a cache line is load-marked by a thread, no other threads are permitted to store to the cache line, thereby preventing another thread from overwriting a value in the cache line. On the other hand, when a cache line is store-marked by a thread, no other threads are permitted to load from or store to the cache line, thereby providing the store-marking thread with exclusive access to the cache line. (Note that the store-mark blocks all accesses to the cache line, while the load-mark only blocks stores to the cache line, hence the store-mark can be considered the "stronger" of the two forms of cache line marking.) We refer to the process of placing such marks on a cache line as either "load-marking" or "store-marking" the cache line.

A load-mark prevents any other thread from writing to the cache line but not from reading from the cache line, so multiple threads can place load-marks on a cache line (i.e., multiple threads can be reading from the cache line simultaneously). Hence, in some embodiments of the present invention, each cache line's metadata includes a "reader count" value that keeps track of how many threads have placed load-marks on the cache line. When multiple threads have load-marked the cache line, other threads are prevented from writing to the cache line until all of the threads have removed their load-marks (i.e., the reader count value is zero).

When a thread has placed a load-mark on a cache line, the thread can perform any number of loads from the cache line. In other words, as long as a load-mark is set on the cache line, the marking thread may freely load the value from the cache line. The store-marks function in the same way for stores to the cache line.

Processor cores 101 and 103 include private buffers 109 and 110, which each include a number of entries for storing the addresses of load-marked and/or store-marked cache lines to facilitate efficient lookups of these addresses. When a thread needs to load from or store to a cache line, the thread first checks its private buffer to determine if the thread has already load-marked or store-marked the cache line.

Note that although only one private buffer is shown per processor core in FIG. 1, in some embodiments of the present invention, each processor core can include multiple private buffers. For example, in some embodiments of the present invention, each processor core includes a private buffer associated with each thread. In these embodiments, if the processor core supports three threads, the processor core includes three private buffers to facilitate each thread keeping track of the load-marks and store-marks that it has placed on cache lines.

Load-Marking

The Load-Mark Request Operation

Figure 2A:
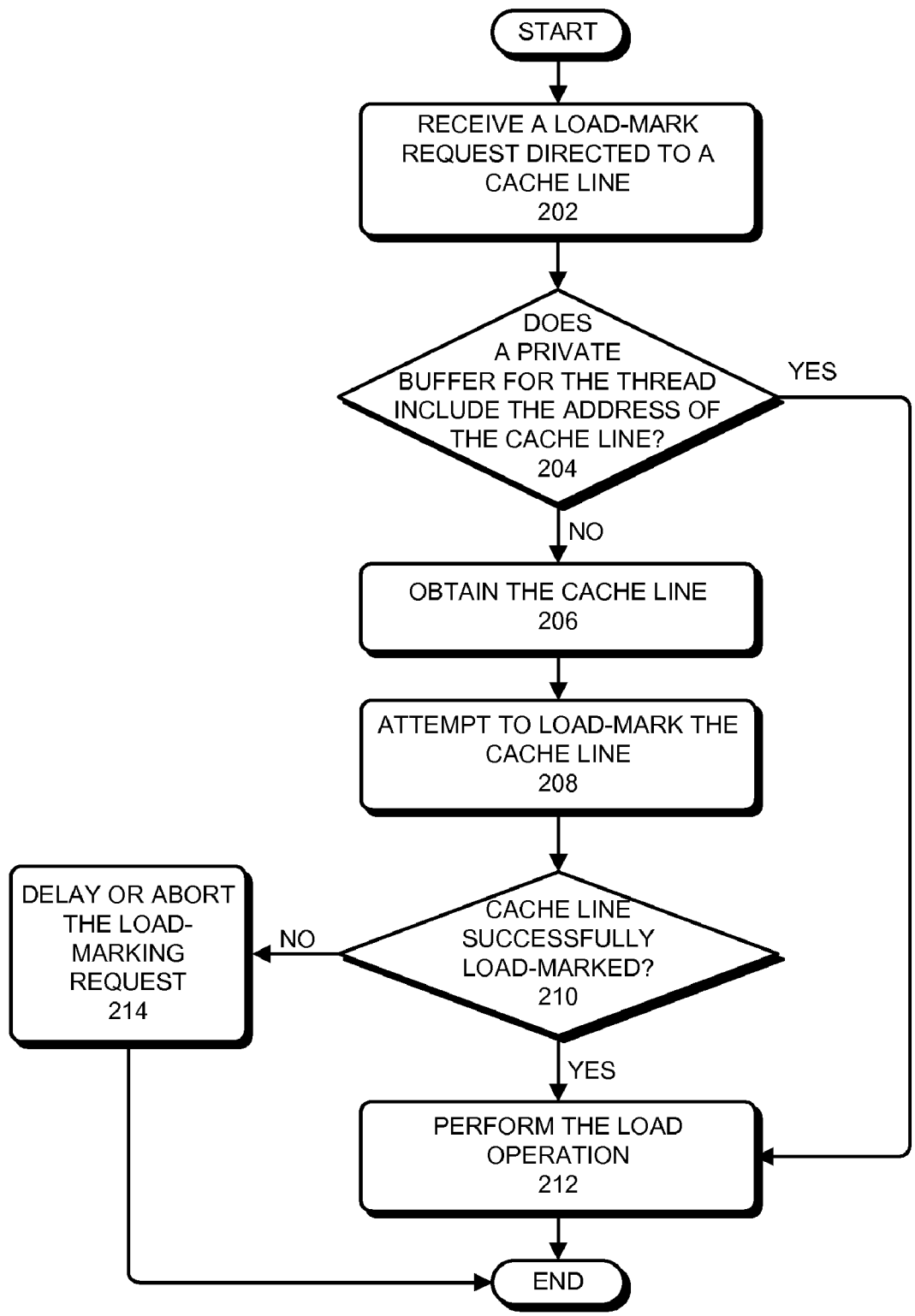
FIG. 2A presents a flowchart illustrating the process of performing a load-mark request operation in accordance with embodiments of the present invention.

FIG. 2A presents a flowchart illustrating the process of performing a load-mark request operation in accordance with embodiments of the present invention. Note that the load-mark request includes two operations; the load-marking operation and the load operation. When a load-mark request is handled, the system first attempts the load-marking operation. Upon successfully concluding the load-marking operation, the system automatically returns the cache line, thereby completing the load operation.

The process starts when the system receives a load-mark request from a thread, wherein the load-mark request is directed to a cache line (step 202). Next, the system checks a private buffer associated with the thread to determine whether the thread has already load-marked the cache line (step 204). Specifically, the system performs a lookup in the thread's private buffer based on the address of the load operation to locate a corresponding address for a load-marked cache line. If the private buffer contains a corresponding address, the thread has already load-marked the cache line and the thread can proceed with the load operation (step 212).

If the private buffer does not contain the corresponding address, the thread has not yet load-marked the cache line. In this case, the system then obtains the cache line (step 206) and attempts to load-mark the copy of the cache line in the local cache (step 208).

If load-marking is successful (step 210), the system performs the load operation (step 212). Otherwise, if the load-marking is unsuccessful, the system retries the load-mark request after a delay. In embodiments of the present invention, the load-mark request is retried a predetermined number of times, and if the load-mark request remains unsuccessful, the load-mark request is aborted (step 214).

Figure 2B:
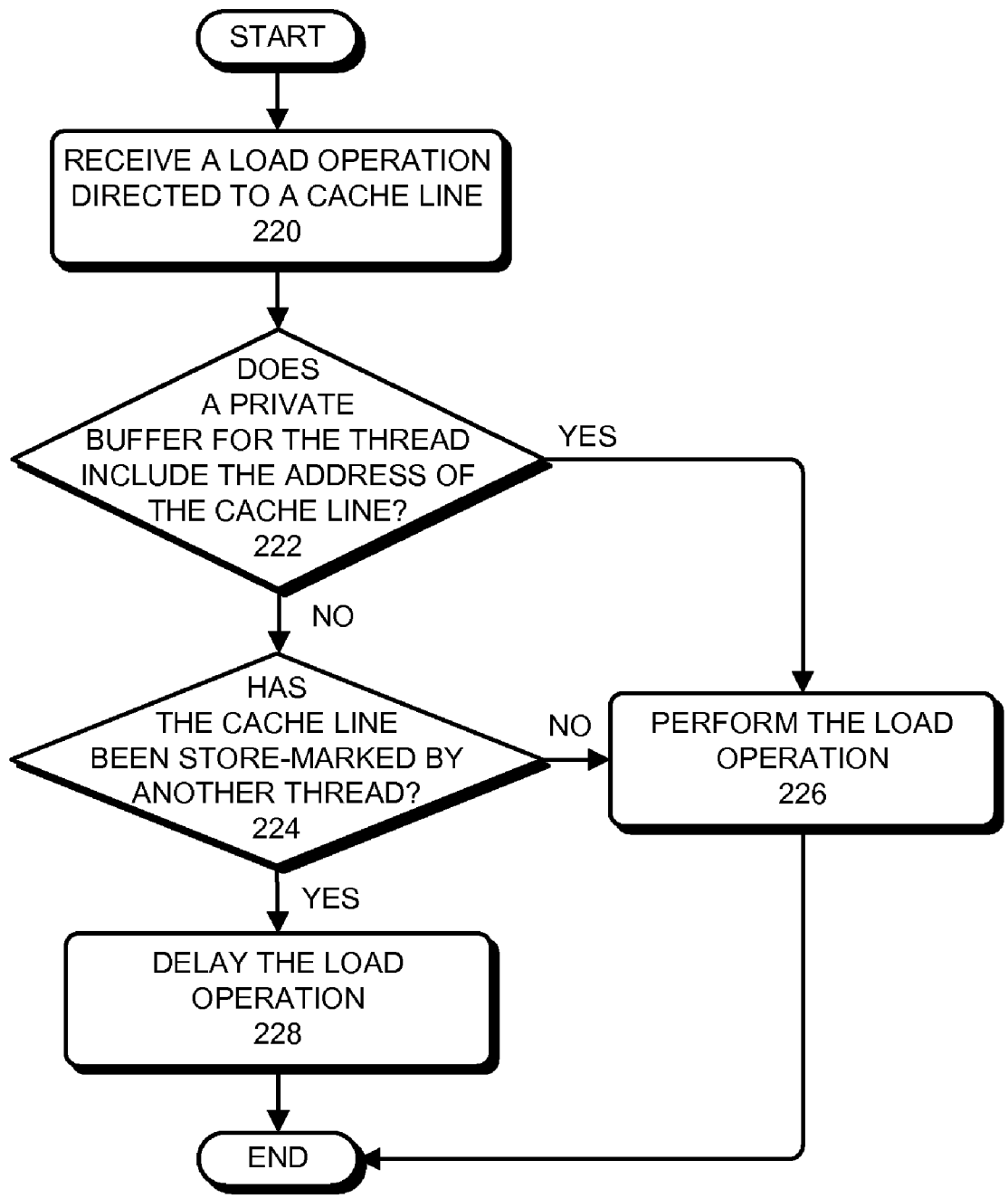
FIG. 2B presents a flowchart illustrating the process of performing a load operation without load-marking the cache line in accordance with embodiments of the present invention.

FIG. 2B presents a flowchart illustrating the process of performing a load operation without load-marking the cache line (i.e., performing a typical load operation) in accordance with embodiments of the present invention. The process starts when the system receives a load operation from a thread, wherein the load operation is directed to a cache line (step 220).

Next, the system checks a private buffer associated with the thread to determine whether the thread has already load-marked the cache line (step 222). Specifically, the system performs a lookup in the thread's private buffer based on the address of the load operation to locate a corresponding address for a load-marked cache line. If the private buffer contains a corresponding address, the thread has already load-marked the cache line and the system performs the load operation (step 226).

If cache line's address is not in the private buffer, the system determines if the cache line has been store-marked by another thread (step 224). If so, the thread cannot load the cache line and the load operation is retried after a delay (step 228). Otherwise, the system performs the load operation (step 226).

Attempting to Load-Mark the Cache Line

Figure 3:
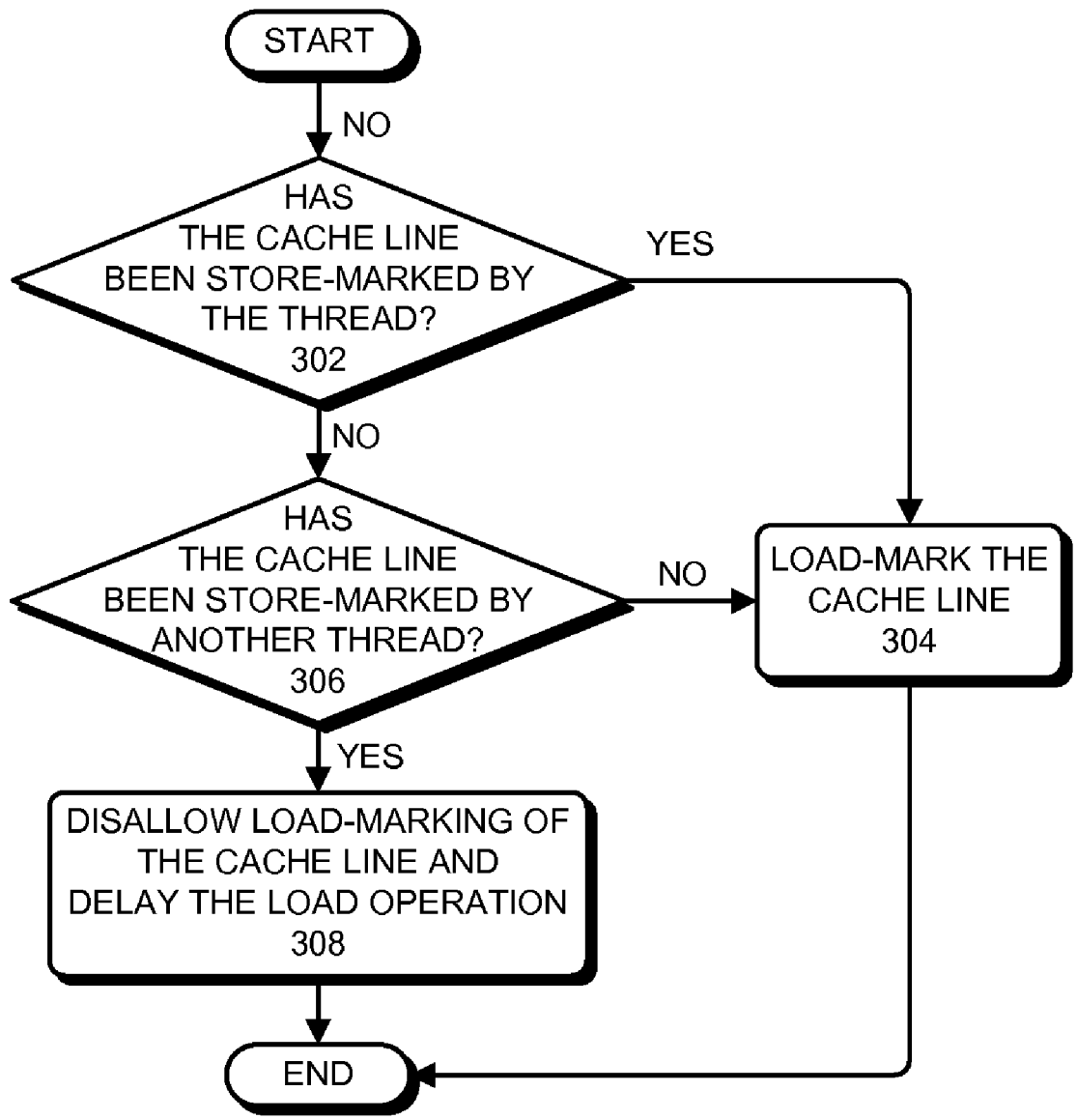
FIG. 3 presents a flowchart illustrating the process of attempting to load-mark the cache line in accordance with embodiments of the present invention.

FIG. 3 presents a flowchart illustrating the process of attempting to load-mark the cache line in accordance with embodiments of the present invention. During this process, the system first determines whether the cache line has been store-marked by the thread (step 302). Specifically, the system checks a private buffer which maintains addresses of cache lines which have been store-marked by the thread to see if the address of the cache line exists in the private buffer.

If the cache line has been store-marked by the thread, no other thread is permitted to load-mark the cache line (because of the exclusive property of store-marks). However, the thread may itself place a load-mark on a cache line that the thread has already store-marked. Hence, in this case, the system load-marks the cache line (step 304).

On the other hand, if the system determines that the cache line has not been store-marked by the thread, the system next determines if the cache line has been store-marked by another thread (step 306). If so, the thread cannot load-mark the cache line and the load operation is delayed (step 308). Otherwise, the system knows that the cache line has not been store-marked by any thread and the system proceeds to load-mark the cache line for the thread (step 304).

Figure 4:
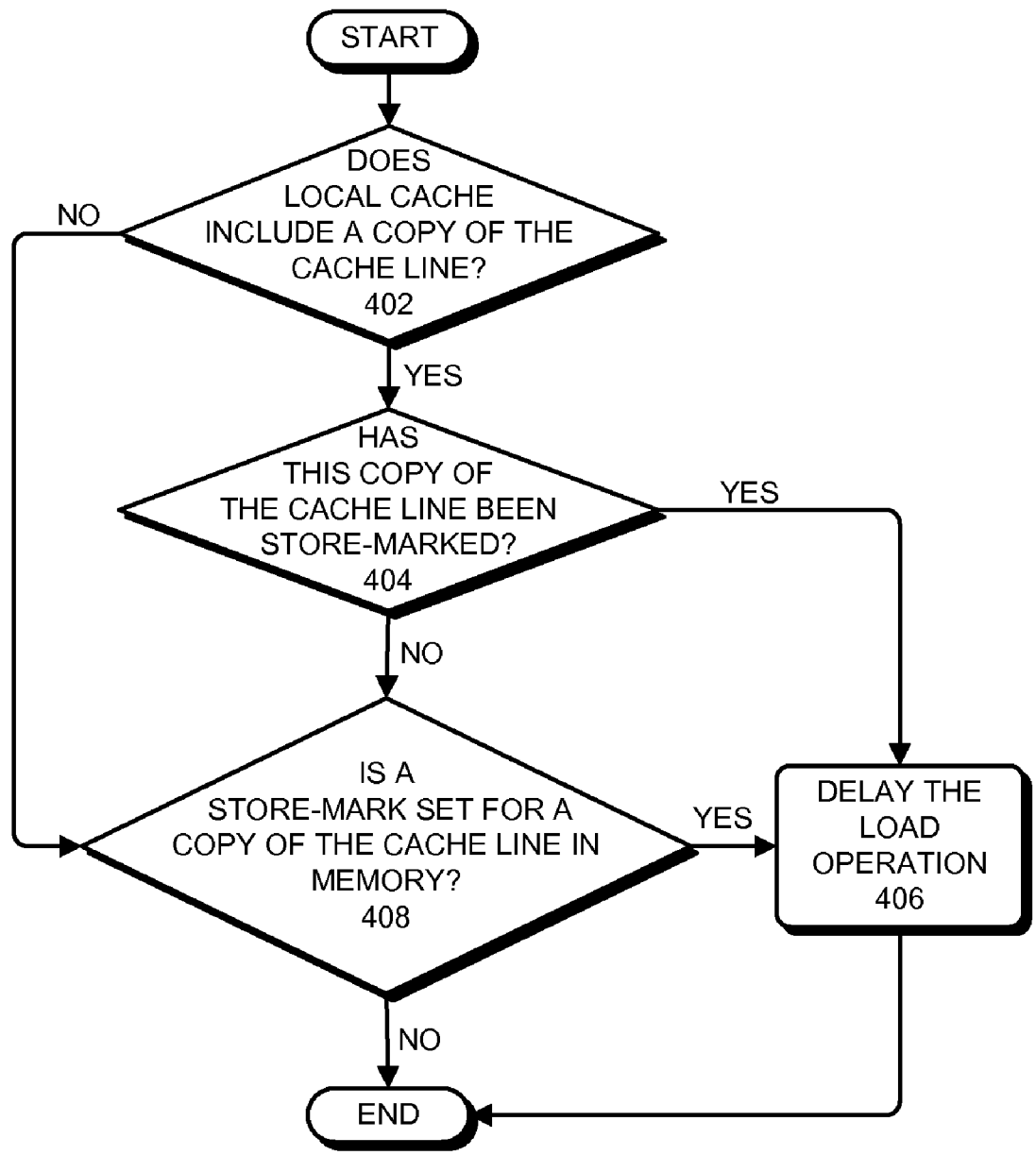
FIG. 4 presents a flowchart illustrating the process of determining whether the cache line has been store-marked by another thread in accordance with embodiments of the present invention.

FIG. 4 presents a flowchart illustrating the process of determining whether the cache line has been store-marked by another thread in accordance with embodiments of the present invention. During this process, system first checks in the thread's local cache for a copy of the cache line (step 402). If the system finds a copy of the cache line in the thread's local cache, the system examines the store-mark in the copy of the cache line to determine whether the cache line has been store-marked by another thread (step 404). If so, the cache line cannot be load-marked and the load operation is delayed (step 406).

On the other hand, if there is no valid copy of the cache line in the local cache, the system determines whether the store-mark has been set in another copy of the cache line which exists in memory (step 408). If so, the cache line has been store-marked by another thread, which means the cache line cannot be load-marked, and the load operation is delayed (step 406).

Store-Marking

The Store-Marking Operation

Figure 5A:
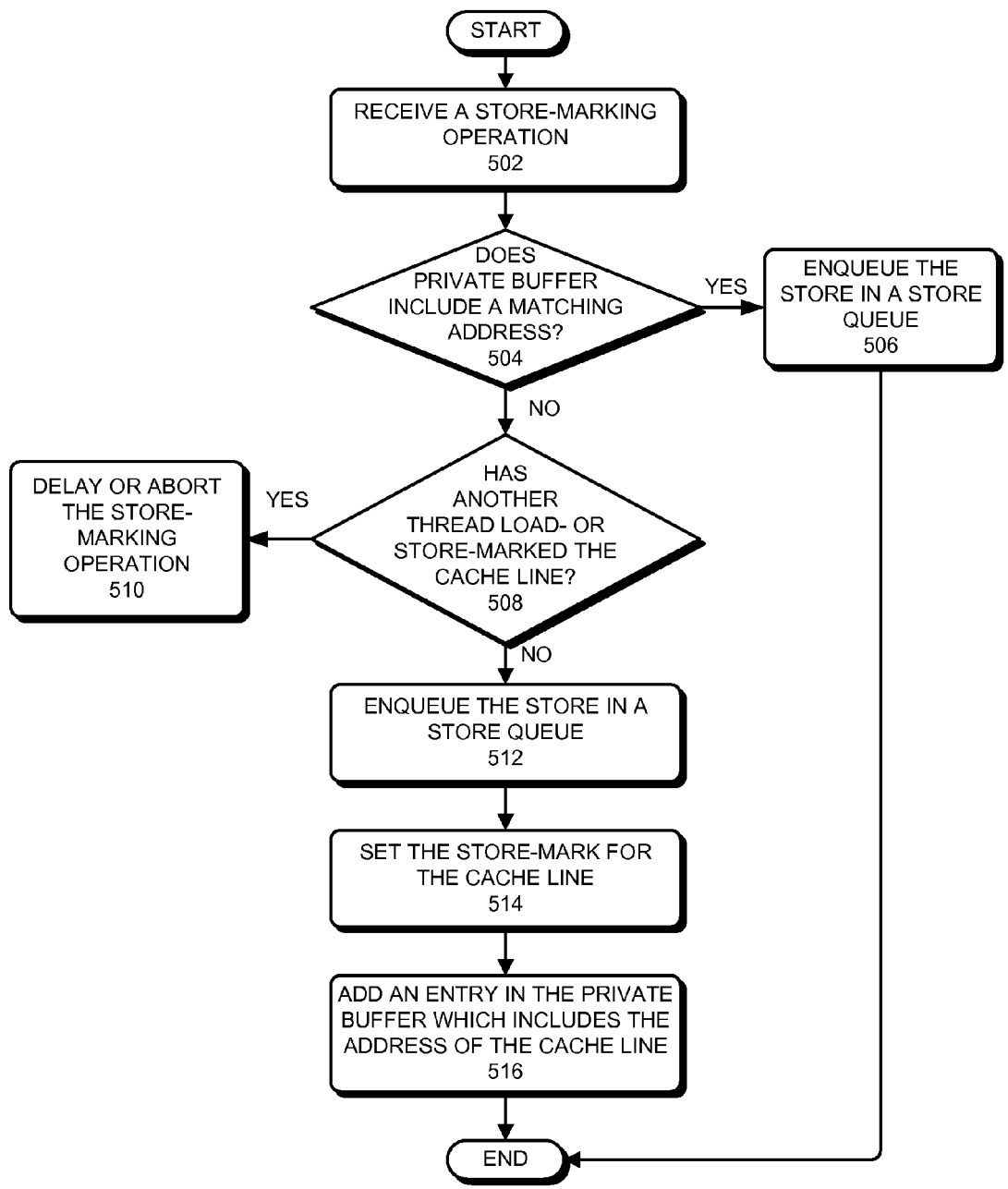
FIG. 5A presents a flowchart illustrating the process of performing a store-marking operation in accordance with embodiments of the present invention.

FIG. 5A presents a flowchart illustrating the process of performing a store-marking operation in accordance with embodiments of the present invention. The system first receives a store-marking operation which is directed to a cache line (step 502).

Next, the system checks the thread's private buffer 109 to determine whether the thread has already store-marked the cache line (step 504). Specifically, the system performs a lookup in the thread's private buffer based on the address of the memory reference to locate a corresponding address for a store-marked cache line. If the private buffer contains a corresponding address, the thread enqueues the store in a store-queue (step 506) and the store-marking operation ends.

If the private buffer does not contain a corresponding address, the thread concludes that it has not set the store-mark. In this case, the thread determines whether the cache line has been store-marked or load-marked by another thread (step 508). During this process, system first checks in the thread's local cache for a copy of the cache line. If the system finds a copy of the cache line, the system examines the load-mark and store-mark to determine whether the cache line has been load-marked or store-marked by another thread. If the store-mark in the copy of the cache line is not set, the system determines whether the store-mark has been set in another copy of the cache line which exists in memory. If a store-mark is set in either location, the store-marking operation is delayed and retried (step 510). On the other hand, in order to determine that no other thread has placed a load-mark on the cache line, the system verifies that either (1) there are no load-marks on the line, or (2) there is exactly one load-mark on the line, and this thread is the one that placed that load-mark on the line (the system can verify this by finding the address of the cache line in the thread's private buffer of cache lines that the thread has load-marked). If there is a load-mark set by another thread on the cache line, the store-marking operation is delayed and retried (step 510). In embodiments of the present invention, the store-marking operation is retried a predetermined number of times, and if the store-marking operation continues to be unsuccessful, the operation is aborted (step 510).

Note that the system can use a cache-coherence mechanism to determine whether another the memory holds a store-marked or load-marked copy of the cache line. This can involve sending an exclusive access request for the cache line to the other caches. If successful, the exclusive access request returns the cache line including store-mark status and the load-mark reader count. In embodiments of the present invention, if the cache line has been store-marked in another cache, the system receives a NACK signal from the other cache which causes the request to fail, in which case the memory operation can be retried. In this embodiment, however, if the system does not receive a NACK signal, the system can then obtain exclusive (writable) access to that cache line provided no other thread has load-marked the cache line.

Note that in order to perform a memory operation, it may be necessary to use the cache coherence protocol to obtain a copy of the cache line in a suitable state in the local cache. For example, if the memory operation is a load, it may be necessary to obtain a copy of the cache line in the shared (S), exclusive (E), owned (O), or modified (M) state. Similarly, if the memory operation is a store, it may be necessary to obtain a copy of the cache line in the E or M state (and if the cache line is in the E state, it may be necessary to change the cache line to the M state upon performing the store). If the cache coherence protocol is used to obtain a copy of the cache line in the E or M state, the request for this copy may differ from the exclusive access request mentioned in the preceding description. This is because the thread performing the store has already placed a store mark on the cache line, and thus the request should not receive a NACK signal.

If a store-mark or load-mark is not set in memory, the system enqueues the store operation in store queue 107 (step 512). Note that enqueuing the store operation in the store queue can involve enqueuing a store that is directed to only a portion of the entry in the store queue. For example, the store operation may be directed to a 8-byte doubleword to a store queue entry that is 64 bytes long. In this case, only 8-bytes of data is available to be enqueued in the store queue.

The system then sets the store-mark for the cache line (step 514) and adds the address of the cache line to the private buffer (step 516). Note that this entry remains in the private buffer until subsequent changes are made to the state of the cache line, such as removing the store-mark.

In embodiments of the present invention, a thread selectively places store-marks on cache lines. In other words, the thread may reorder some stores and not reorder other stores, in which case the thread store-marks on cache lines associated with stores that are reordered, but does not have to store-mark cache lines associated with stores that are not reordered.

Figure 5B:
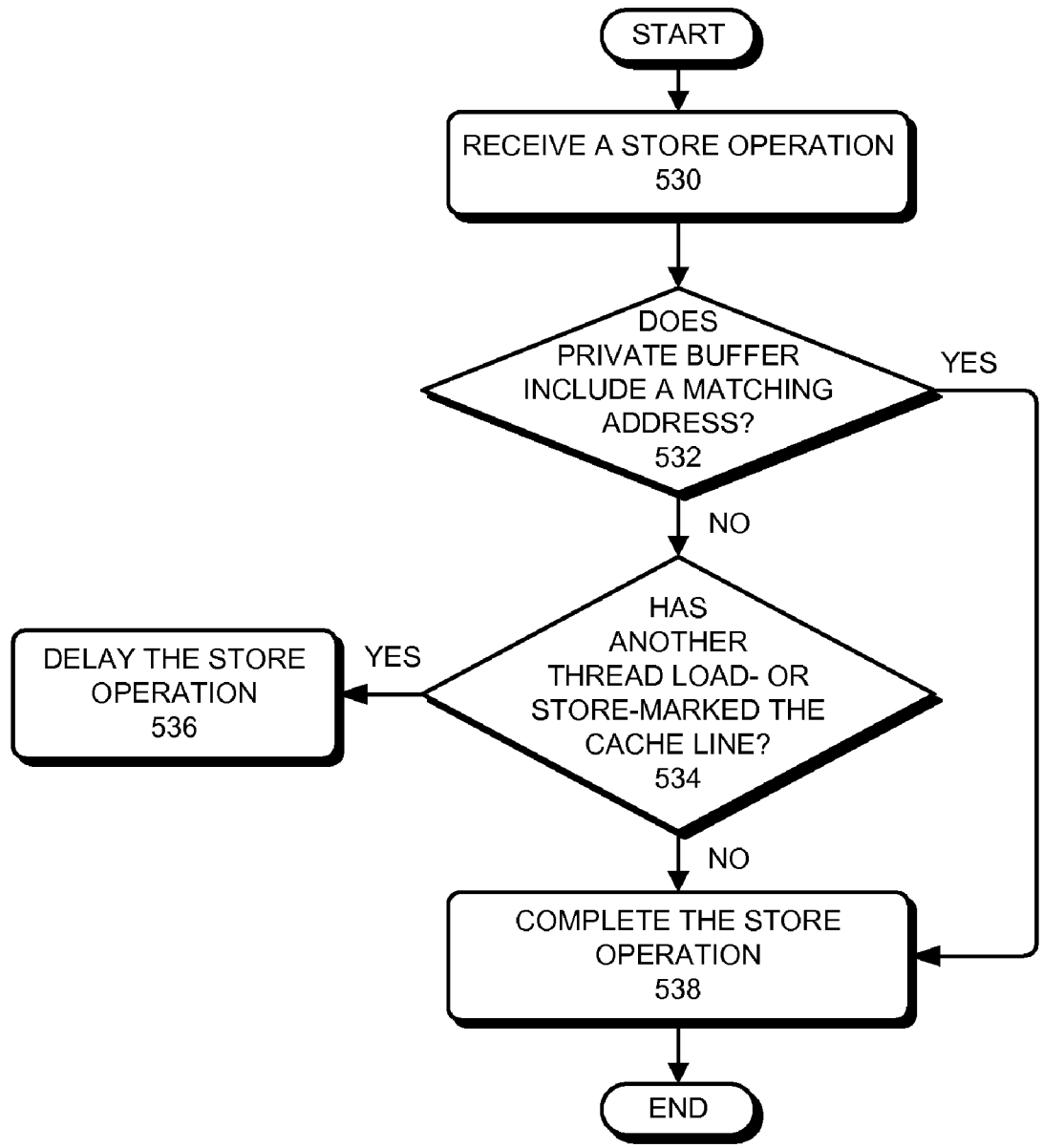
FIG. 5B presents a flowchart illustrating the process of performing a store operation on a cache line that has not been store-marked in accordance with embodiments of the present invention.

FIG. 5B presents a flowchart illustrating the process of performing a store operation on a cache line that has not been store-marked in accordance with embodiments of the present invention. The system first receives a store operation for a thread from the store queue which is directed to a cache line (step 530). For the purposes of illustration, we assume that the store operation was the oldest store operation in the store queue and that the store operation has not been re-ordered with respect to other store operations.

Next, the system checks the thread's private buffer 109 to determine whether the thread has already store-marked the cache line (step 532). Specifically, the system performs a lookup in the thread's private buffer based on the address of the memory reference to locate a corresponding address for a store-marked cache line. If the private buffer contains a corresponding address, the thread proceeds with the store operation (step 538).

If, however, the private buffer does not contain a corresponding address, the thread concludes that it has not set the store-mark. If the thread has not set the store-mark, the system determines whether the cache line has been store-marked or load-marked by another thread (step 534). During this process, the system first checks in the thread's local cache for a copy of the cache line. If the system finds a copy of the cache line, the system examines the store-mark to determine whether the cache line has been store-marked by another thread. If the store-mark in the copy of the cache line is not set, the system determines whether the store-mark has been set in another copy of the cache line which exists in memory. If a store-mark is set in either location, the store operation is retried after a delay (step 536). On the other hand, in order to determine that no other thread has placed a load-mark on the cache line, the system verifies that either (1) there are no load-marks on the line, or (2) there is exactly one load-mark on the line, and this thread is the one that placed that load-mark on the line (the system can verify this by finding the address of the cache line in the thread's private buffer of cache lines that the thread has load-marked). If there is a load-mark set by another thread on the cache line, the store operation is retried after a delay (step 536).

Propagating Store-Marks and Load-Marks

In embodiments of the present invention, the system eventually propagates the load-marks and store-marks in the metadata for a cache line to the memory and to disk. The following sections explain the process of propagating the load-marks and store-marks. Note that we refer to the combination of load-marks and store-marks together as "metadata" for cases where load-marks and store-marks are propagated in a similar way.

Note that obtaining a copy of the cache line in the proper coherency protocol state (as detailed in the following sections) is just the first step in reading from or writing to a cache line. After the cache line has been obtained in the proper coherency protocol state, the system has to verify that the desired access can be performed and, if necessary, mark the cache line before performing a load from or store to the cache line.

Figure 6A:
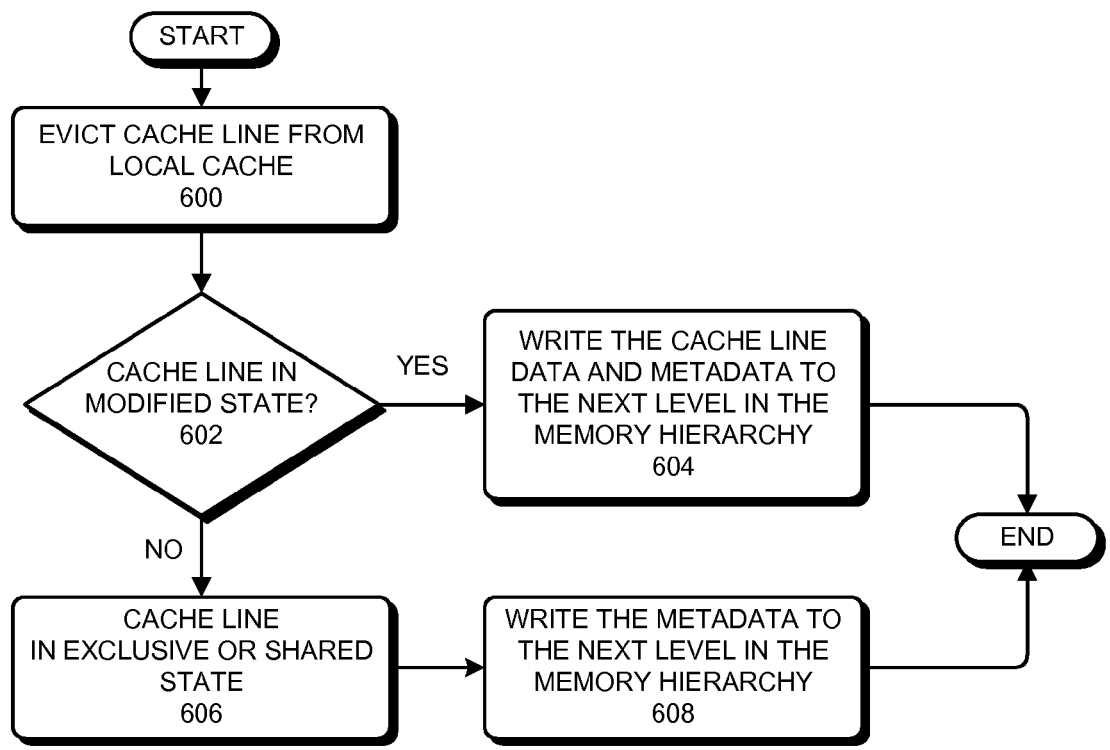
FIG. 6A presents a flowchart illustrating the process of propagating load-mark metadata for an evicted cache line in accordance with embodiments of the present invention.

We first consider the case where a cache line is evicted from a cache as illustrated in FIG. 6A. The process starts when a cache line is evicted from a cache (step 600). The system determines if the cache line is in the modified state (step 602). If so, the system evicts the line by writing the cache line data and the metadata to the next level of the memory hierarchy (step 604).

On the other hand, if the cache line is not in the modified state, but is in the exclusive state or shared state (step 606), the system does not propagate the data in the cache line, but writes the metadata to the next level of the memory hierarchy (step 608).

Figure 6B:
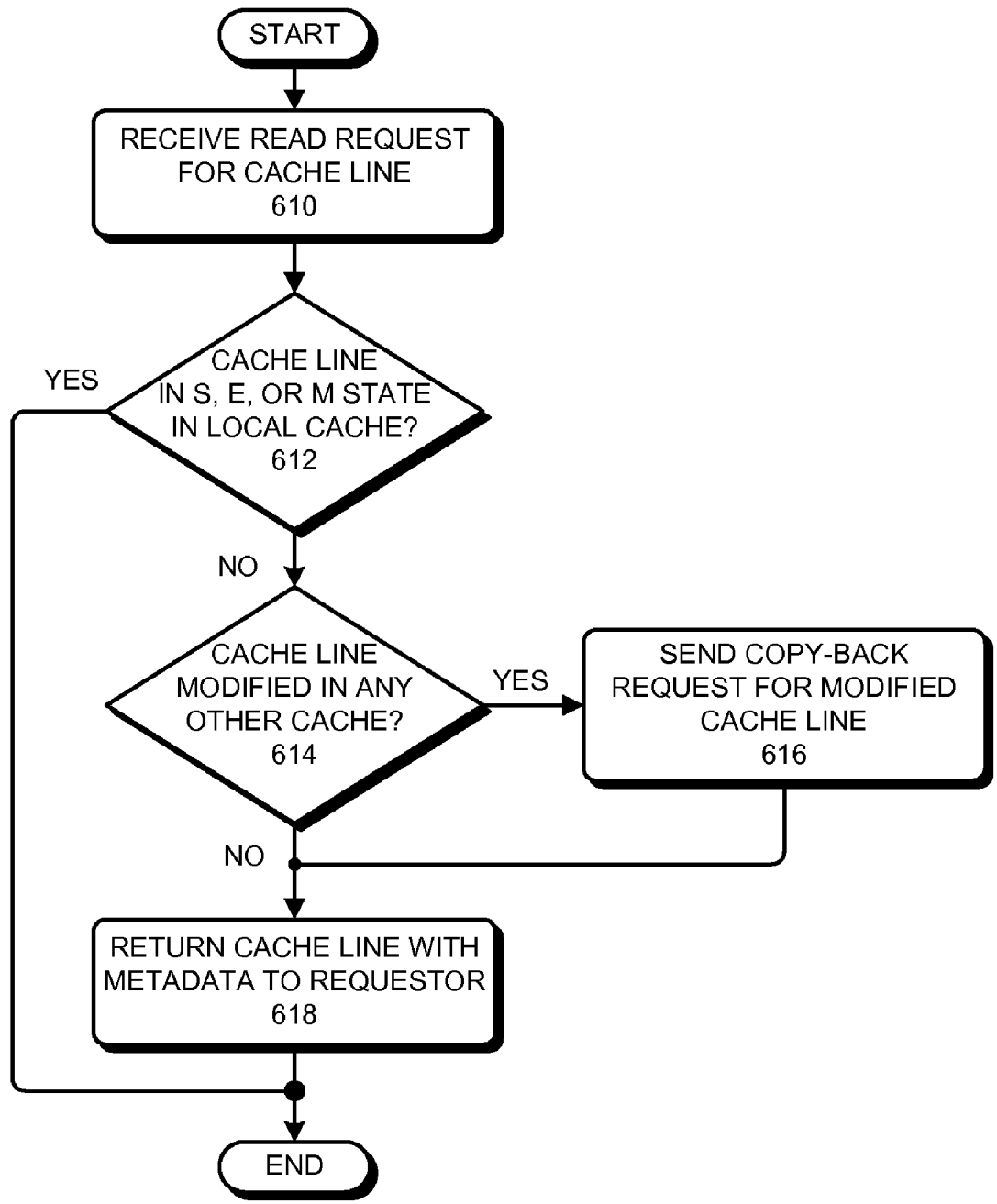
FIG. 6B presents a flowchart illustrating the process of propagating load-mark metadata for a cache line during a load operation in accordance with embodiments of the present invention.

We next consider the case where the cache line is subject to a read operation as illustrated in FIG. 6B. The process starts when the system receives a read request for a cache line (step 610). The system first determines if the cache line is held the shared, exclusive, or modified state in the thread's local cache (step 612). If so, the thread can read the local copy of the cache line and the process is complete.

Otherwise, the system determines if the cache line is held in any other processor's cache in the modified state (step 614). If so, the system sends a copyback coherence request to that cache (step 616). Upon receiving a copyback coherence request, the processor that holds the modified copy of the cache line responds with a copy of the cache line and the metadata, which are returned to the requester (step 618). Note that when responding to the copyback coherence request, the processor that holds the modified copy responds with a copy of the cache line, but also retains a local copy of the cache line in the shared state.

When the processor sends the load-mark in response to a copyback coherence request, the processor can partition the reader count value into two parts and can send part of the reader count value and can retain part of the reader count value. However, the sum of the sent reader count value and the retained reader count value must equal the starting reader count value in the local copy of the cache line. For example, where the reader count value in the local copy of the cache line originally indicated that there were four load marks on the cache line, the processor can send two of the load marks with the sent line, while retaining two of the load marks in the local copy of the cache line.

Figure 6C:
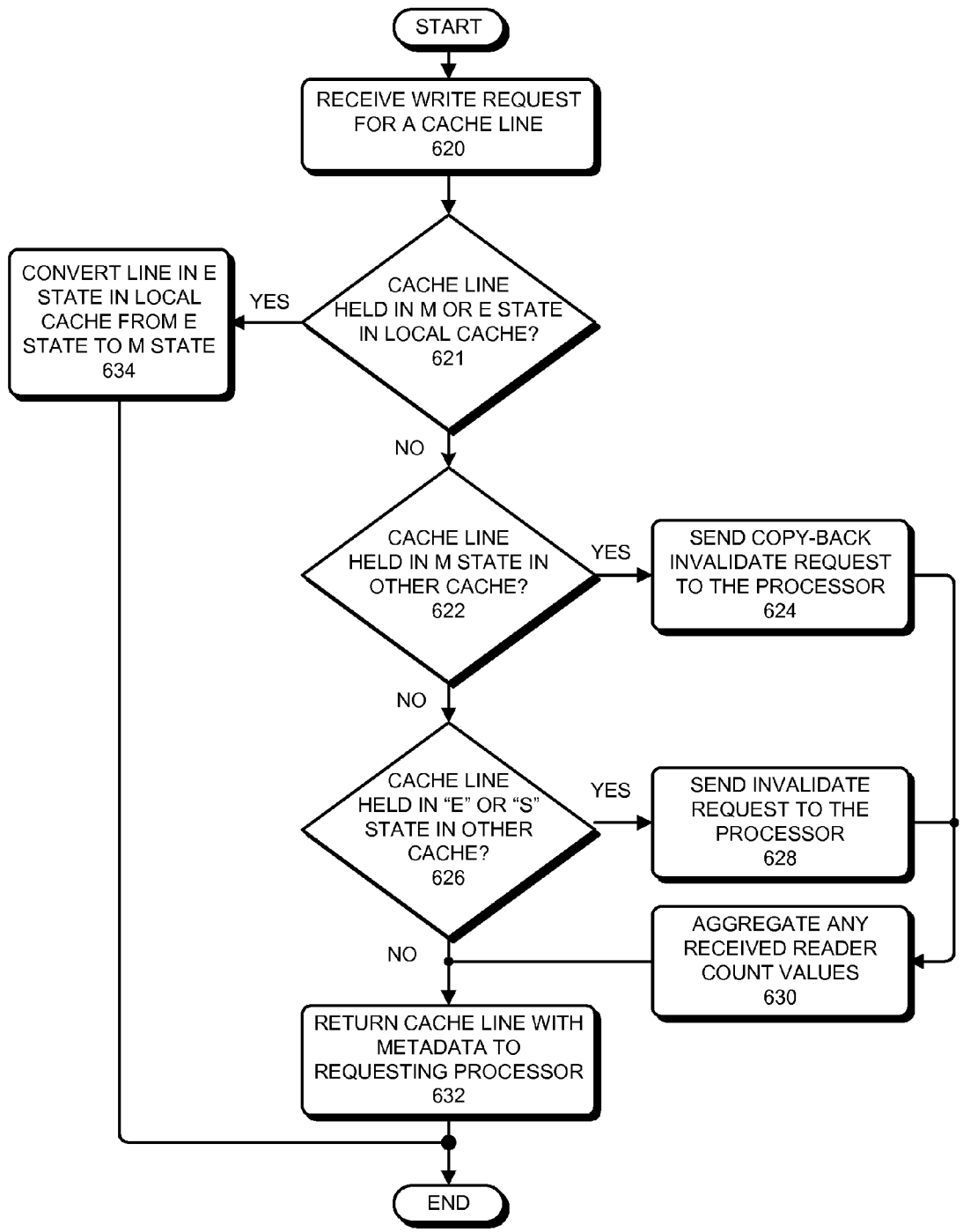
FIG. 6C presents a flowchart illustrating the process of propagating load-mark metadata for a cache line during a store operation in accordance with embodiments of the present invention.

We next consider the case where the cache line is subject to a write request that is illustrated in FIG. 6C. Note that a thread attempting to write to the cache line first obtains a copy of the cache line in the modified state, which invalidates all copies of the line in other caches and obtains the cache line in the modified state for the requesting thread.

The process starts when the system receives a write request for a cache line (step 620). The system first determines if the cache line is held in the local cache in the modified or exclusive state (step 621). If the cache line is held in the modified state, the thread already has write access to the cache line, so the process is complete.

If the cache line is held in the exclusive state, the system can change the status of the copy of the cache line to the modified state (step 634). In order to change the status of the local copy of the cache line from the exclusive state to the modified state, the system implicitly invalidates the copy of the cache line held in the memory system. Hence, for embodiments of the present invention, whenever a cache line is delivered to a local cache in the exclusive state, the cache line is delivered with reader count equal value to the total number of threads that have put load-marks on the cache line. In other words, when the cache line is delivered, the reader count value in the memory system is zero and all of the load-marks are included in the metadata for the local copy of the cache line. Note that the store-mark is propagated with each copy of the cache line, so the store-mark receives no special treatment in this embodiment.

If the cache line is held in any other processor's cache in the modified state (step 622), the system sends a copyback-invalidate coherence request to that cache (step 624). Upon receiving the copyback-invalidate coherence request at a given cache that holds the copy of the cache line, the cache line data and metadata are propagated back to the memory and the local copy of the given cache line in the given cache is invalidated.

On the other hand, if the system receives a write request for a cache line that is held in any other processor's cache in the exclusive state or the shared state (step 626), the system sends an invalidate coherence request to all other caches in the coherence domain that may contain a valid copy of the cache line (step 628). Upon receiving the invalidate coherence request at a given cache that holds the copy of the cache line, the metadata is propagated back to the disk and the local copy of the cache line in the given cache is invalidated.

In addition, the system determines the number of load-marks that are on the copy of the cache line in memory. In embodiments of the current invention, the system makes the determination by reading the metadata of the cache line in memory.

The system then sums load-marks in the metadata received from memory and from the disk (step 630) and responds to the requester with a cache line, including the metadata (step 632). Hence, the copy of the line delivered to the requesting thread has a reader count value which is equal to the number of threads that have placed a load-mark on the line and a store-mark that is asserted if any other thread had asserted a local store-mark.

By propagating the metadata as described above, the system maintains the invariant that the sum of the load-marks in all valid copies of a cache line equals the total number of threads that have load-marked the line. Maintaining this invariant prevents a thread from storing to a line on which another thread has placed a load-mark.

Note that the system can use negative, as well as positive, values for reader count values. This can be helpful when a thread wants to remove a load-mark from a cache line that has been evicted from its local cache.

Tracking Load-Marks and Store-Marks

Phases of Operation

In embodiments of the present invention, the system tracks load-marks and/or store-marks placed on cache lines to facilitate removing the load-marks and/or store-marks from the cache lines. For example, embodiments of the present invention remove load-marks and store-marks when a phase of operation is completed. A transaction is one type of a phase of operation where the system removes load-marks and/or store-marks upon completion. However, in general, any operation or series of operations during which load-marks and/or store-marks are placed on cache lines can be considered a phase of operation.

Embodiments of the present invention use load-marks and store-marks to implement transactions by requiring that: (1) the processor (or thread) places a load-mark on all lines read during a transaction; (2) the processor (or thread) places a store-mark on all lines written to during the transaction; (3) these load-marks and store-marks are all held simultaneously when the transaction commits; (4) all loads that precede the transaction in program order are either committed prior to the transaction commit or have a load-mark on the cache line when the transaction commits; and (5) all stores that precede the transaction in program order are either committed prior to the transaction commit or have a store-mark on the cache line when the transaction commits. These rules guarantee that all reads and writes within the transaction are committed (in program order) to the architectural state of the processor when the transaction commits, without any intervening memory accesses from any other processors (or threads), thus preserving transactional semantics. Specifically, when the transaction commits: (1) all earlier (in program order) loads for which load-marks are held are committed (to the architectural state of the processor); (2) all earlier (in program order) stores for which store-marks are held are committed; and (3) all loads and stores within the transaction are committed.

Embodiments of the present invention use the same rules to implement atomic instructions (such as read-modify-write) by viewing the load and store portions of the atomic instruction as forming a (very short) transaction. Note that the rules do not require stores which are earlier than the atomic instruction to commit to the memory system before the atomic instruction commits. Rather, such earlier stores can simply hold their store-marks when the atomic instruction commits. As a result, processing atomic instructions does not require draining the store queue. Furthermore, embodiments of the present invention use the same rules to facilitate processor hardware executing speculatively and out-of-order. In other words, for these embodiments, hardware-supported speculative execution can also be viewed as a transaction.

CAM

In some embodiments of the present invention, private buffers 109 and 110 are used by an associated thread to keep track of load-marks and/or store-marks, and are implemented as content-addressable memories (CAMs) (also called "mark CAMs"). The mark CAMs 700 (see FIG. 7) include a number of entries that the associated thread can use to track the load-marks and/or store-marks that the thread has placed on cache lines. During operation, a mark CAM 700 includes a valid entry associated with each cache line that has a load-mark and/or store-mark placed on it by the associated thread.

When a thread needs to place a load-mark or store-mark on a cache line, the system first checks its associated mark CAM 700 to see if the thread already has a mark of the given type (or a stronger mark). For example, assuming that the system is attempting to place a load-mark on the cache line for a thread, the system can check the mark CAM 700 to determine if the cache line already has either a load-mark or a store-mark (which is stronger than a load-mark). If the thread already has a corresponding mark or a stronger mark, no additional mark is placed on the cache line, and the mark CAM 700 is left unchanged.

If no mark has been placed on the cache line for the thread, the system attempts to place a mark on the cache line (as described above). If the attempt to place the mark is successful, the system adds (or updates) an entry in the mark CAM 700, thereby recording the placement of the mark for the thread.

Tracking Load-Marks and Store-Marks for More than One Phase of Operation

Embodiments of the present invention keep track of the load-marks and/or store-marks placed by a thread during multiple phases of operation. More specifically, the system generates separate records in the mark CAM 700 for load-marks and/or store-marks placed by an associated thread during two or more separate phases of operation. In order to keep the separate records, the system records both information about the load-marks and/or store-marks and information about the phase of operation that was executing when the system updated the entry in the mark CAM 700.

In the following section we describe embodiments of the present invention that track cache line marks placed during two phases of operation. However, other embodiments of the present invention can keep track of load-marks and/or store-marks placed during 3 or more phases of operation using the same principles. In addition, we assume that embodiments of the present invention track stores in the store queue at a DW resolution, although other resolutions can be used with the same principles.

Figure 7:
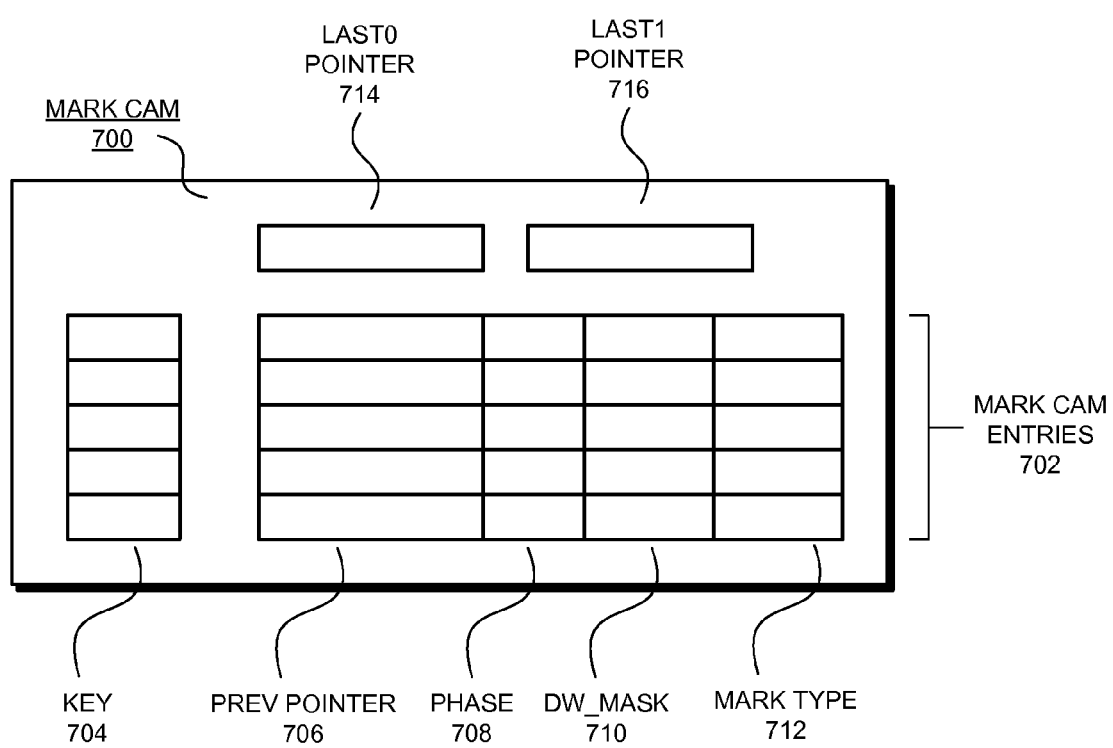
FIG. 7 illustrates a mark CAM that includes a number of mark CAM entries in accordance with embodiments of the present invention.

FIG. 7 presents a mark CAM 700 that includes mark CAM entries 702 in accordance with embodiments of the present invention, wherein each mark CAM entry 702 includes a key 704. When adding an entry in mark CAM 700, the system uses the address of the associated load-marked or store-marked cache line as the key 704.

In addition, each mark CAM entry 702 includes a body that includes the following fields:

TABLE 1

CAM Entry Body Fields

| Field | Contents |
|---|---|
| Prev Pointer 706 | Pointer to another entry in the CAM or to NULL |
| Phase 708 | 0/1 |
| DW_mask 710 | A bit mask that includes 1 bit per DW in the cache line indicating whether or not the store queue contains an entry for the given DW |
| Mark-Type 712 | None/Load/Store/Both |

To facilitate recording which phase of operation is current when a given mark CAM entry 702 is added or updated, each mark CAM entry 702 includes a phase 708 indicator. In addition, the system includes a phase flag associated with each thread that contains a value representing the thread's current phase of operation. When adding a mark CAM entry 702, the system sets the phase 708 indicator in the mark CAM entry 702 to the value of the phase flag.

In embodiments of the present invention, a mark CAM entry 702 may already be present in mark CAM 700 for a cache line that has a load-mark and/or store-mark placed on it during the current phase of operation. That is, an existing mark CAM entry 702, for which the associated cache line had a load-mark or store-mark placed on it in a prior phase of operation (e.g., phase "0"), may have the same type of mark placed on it in the current phase of operation (e.g., phase "1") before the system finishes deleting mark CAM entries 702 from the prior phase. In this case, instead of adding a new mark CAM entry 702, the system updates the existing mark CAM entry 702. For example, when updating the mark CAM entry 702, the system changes the phase 708 indicator for the mark CAM entry from the value representing the prior phase of operation to a value representing the current phase of operation.

In embodiments of the present invention, each mark CAM entry 702 includes a bit mask (DW_mask 710) which contains a number of bits that facilitate tracking which portions of an entry in the store queue include data that is to be written to a corresponding store-marked cache line. Whenever a store is added to the store queue (e.g., store queue 107), the corresponding bit(s) of DW_mask 710 are set in the mark CAM entry 702 for the cache line. On the other hand, when updating an existing mark CAM entry 702, the system updates the DW_mask 710 in the entry to include bits for the store that was buffered to the store queue in the current phase of operation.

In embodiments of the present invention, each mark CAM entry 702 includes a mark-type 712 field that indicates which type(s) of mark(s) have been placed on the associated cache line. For example, the system can set the mark-type 712 field to indicate that a load-mark or a store-mark (or both) have been placed on the associated cache line.

In embodiments of the present invention, each mark CAM entry 702 includes a previous ("prev") pointer 706. The system uses the prev pointers and two "last" pointers, "last0" 714 and "last1" 716, to generate a record of the cache lines which are load-marked and/or store-marked during a given phase of operation. The last pointer points to the mark CAM entry 702 that was most recently modified (i.e., added or updated) during the associated phase of operation. For example, assuming that last0 pointer 714 is associated with phase "0," last0 pointer 714 points to the mark CAM entry 702 that was most recently updated during phase 0 (or to NULL if no entries have been updated).

In order to generate the record of the cache lines load-marked and/or store-marked during a current phase of operation, the system adds each mark CAM entry 702 to the end of a sequence of mark CAM entries 702. The system links the sequence of mark CAM entries 702 together using the prev pointers 706 for each mark CAM entry 702 in the following way. Whenever the system adds a new mark CAM entry 702, the system uses the last pointer associated with the current phase of operation to determine the most recently modified mark CAM entry 702 for the current phase of operation. The system then sets the newly added mark CAM entry 702's prev pointer to point to the last updated mark CAM entry 702 (or to NULL if the new entry is the first entry added to the mark CAM 700 during the current phase of operation). The system then updates the last pointer to point to the newly updated mark CAM entry 702.

Although adding mark CAM entries 702 during a current phase of operation involves adjusting the prev and last pointers, when updating an existing mark CAM entry 702, the system does not update the prev pointers and the last pointer. Instead, the system leaves the mark CAM entry 702 in the sequence of mark CAM entries 702 associated with the prior phase of operation. In other words, the prev pointer for the updated mark CAM entry 702 (and, if applicable, the last pointer corresponding to the prior phase of operation) are unchanged. This preserves the sequence of mark CAM entries 702 from the prior phase of operation to facilitate the eventual deletion of the mark CAM entries 702 from the prior phase of operation.

Next, when subsequently deleting the mark CAM entries 702 for the prior phase of operation, the system discovers that the phase 708 indicator for the updated mark CAM entry 702 is set to the current phase of operation and, instead of deleting the mark CAM entry 702, the system adds the existing mark CAM entry 702 to the sequence of mark CAM entries 702 associated with the current phase of operation. When adding the existing mark CAM entry 702 to the sequence of mark CAM entries 702 associated with the current phase of operation, the system uses the last pointer associated with the current phase of operation to determine the last modified mark CAM entry 702 for the current phase of operation. The system then sets the existing mark CAM entry 702's prev pointer to point to the last updated mark CAM entry 702 (or to NULL if the new entry is the first entry added to the mark CAM 700 in the current phase of operation). (Note that the system records the value of the prev pointer before shifting the prev pointer to enable the system to continue traversing the mark CAM entries 702 associated with the prior phase of operation.) The system then updates the last pointer of the current phase to point to the existing mark CAM entry 702. Next the system proceeds to delete any remaining mark CAM entries 702 associated with the prior phase of operation.

Handling Mark CAM Entries

Figure 8:
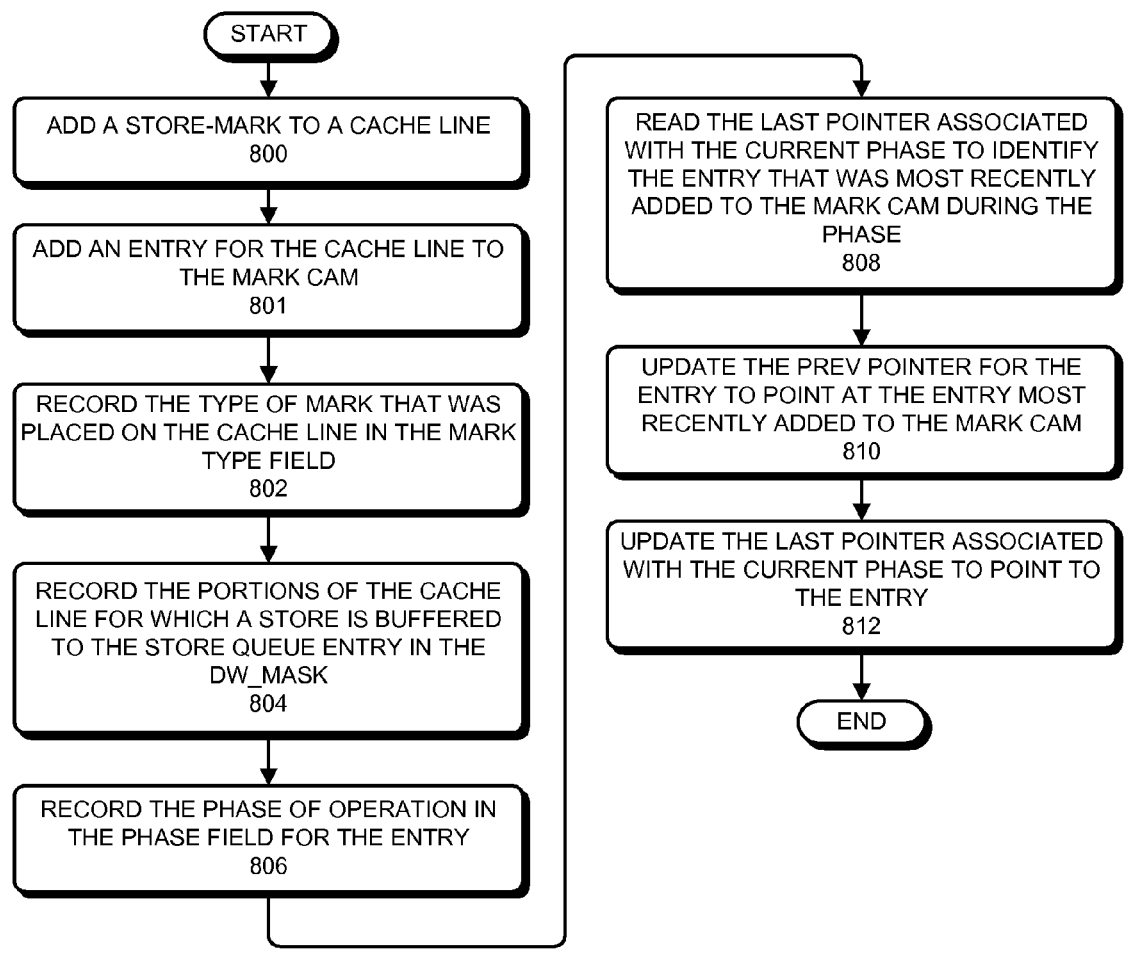
FIG. 8 presents a flowchart illustrating the process of adding an entry in a mark CAM in accordance with embodiments of the present invention.

FIG. 8 presents a flowchart illustrating the process of adding an entry in mark CAM 700 in accordance with embodiments of the present invention. For the purposes of illustration, we assume that the cache line is successfully store-marked using the process described above with reference to FIG. 5A. In addition, we assume that the store is directed to a doubleword within the cache line and that the store is successfully buffered in the store queue. Moreover, we assume that an entry for the cache line is not already present in mark CAM 700.

Note that although we describe a process involving a store-mark, embodiments of the present invention use a similar process for adding an entry to mark CAM 700 for a load-mark.

Upon encountering a store to a cache line at address "A" during a phase of operation "1," the system adds a store-mark to the cache line (step 800). The system also buffers the store in the corresponding bytes in the store queue (e.g., store queue 107). The system then adds an entry for the cache line to mark CAM 700 (step 801). When adding the entry in mark CAM 700, the system uses the cache line address as the key 704. (Note that this means that each mark CAM entry 702 includes the address of the associated cache line in the key 704.)

Next, the system records status information about the phase of operation and cache line mark in the mark CAM entry 702. In doing so, the system records: (1) the type of mark that was placed on the cache line in the mark-type 712 field (step 802); (2) the portions of the cache line for which stores were buffered to the store queue entry in the DW_mask 710 (step 804); and (3) the phase of operation in the phase 708 indicator (step 806).

The system next determines the value of the last1 pointer (i.e., the "last" pointer that is associated with phase 1) to determine the entry that was most recently added to mark CAM 700 during phase 1 (step 808). Next, the system updates the prev pointer 706 for the entry to point at the entry most recently added to mark CAM 700 (step 810) and updates the last1 pointer to point at the newly added entry (step 812). Updating the pointers in this way adds the new entry to the end of the sequence of entries associated with the current phase of operation. (Note that if there is no previous entry in mark CAM 700 for phase 1, the prev pointer 706 for the entry is set to NULL and the last1 pointer is set to point at the newly added entry, thereby making the entry the first in the sequence.)

Note that the process of updating a mark CAM entry 702 that is already present in the mark CAM 700 is different from the process of adding a new entry to mark CAM 700. More specifically, the system updates an existing mark CAM entry by: (1) recording the current phase of operation; (2) updating the DW_mask; and (3) updating the mark-type 712 field for the mark CAM entry 702. However, the system does not adjust the prev pointer for the mark CAM entry 702 and the last pointer (e.g., last1 pointer 714) until the mark CAM entries 702 for the prior phase are deleted (as described above with respect to FIG. 9).

Figure 9:
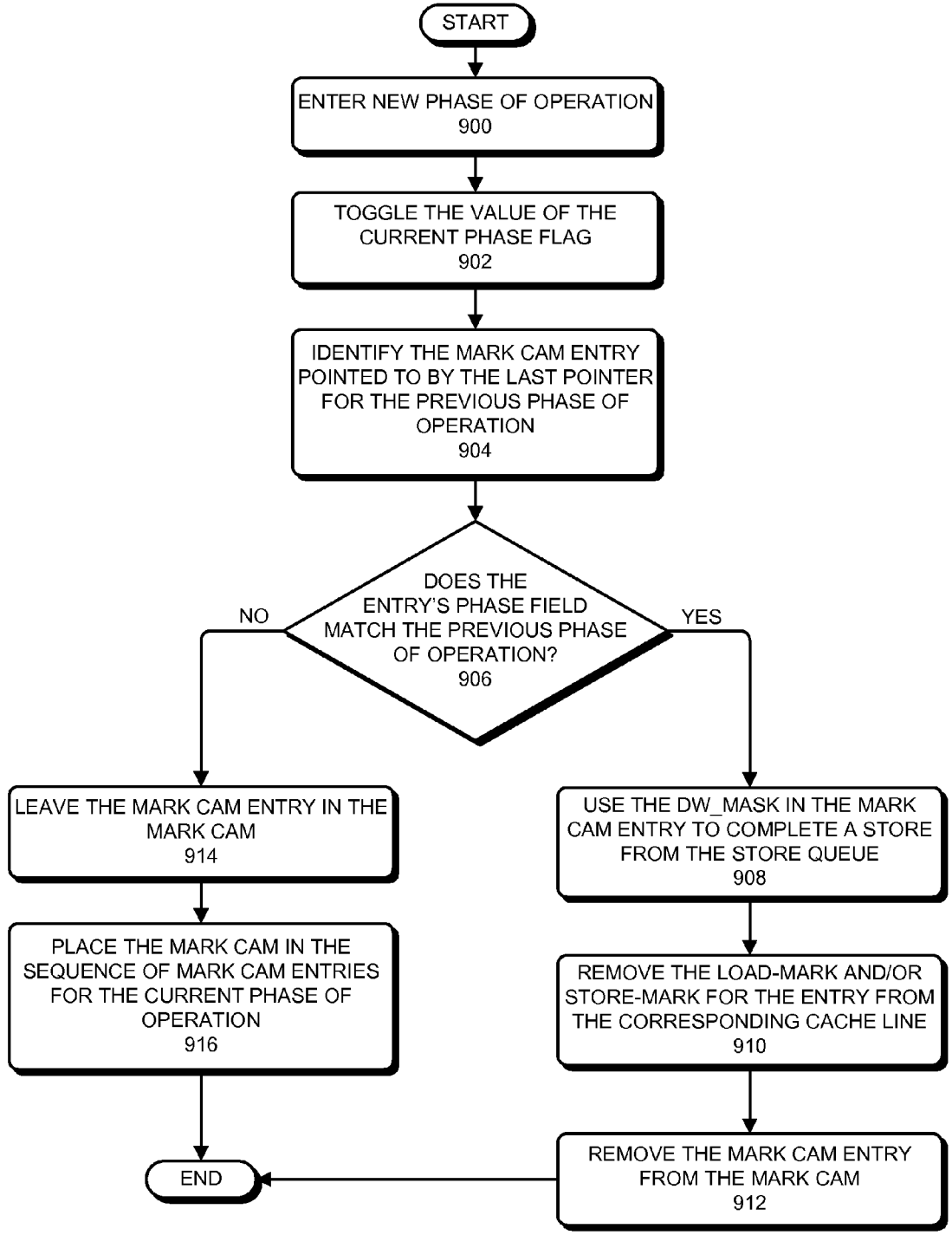
FIG. 9 presents a flowchart illustrating the process of deleting mark CAM entries in accordance with embodiments of the present invention.

FIG. 9 presents a flowchart illustrating the process of deleting mark CAM entries 702 in accordance with embodiments of the present invention. As shown in FIG. 9, the thread first enters a new phase of operation (step 900). As described above, entering a new phase of operation can involve a thread entering a new transaction or commencing another type of operation or series of operations wherein the thread places load-marks and/or store-marks on cache lines. The system then toggles the value of the thread's current phase flag (step 902).

Next, the system clears load-marks and/or store-marks from cache lines and completes store operations buffered during the previous phase of operation by: (1) removing the load-marks and/or store-marks placed during the previous phase of operation; (2) performing the cache line updates for stores placed in the store queue during the previous phase of operation; and (3) removing mark CAM 700 entries placed during the previous phase of operation.

When performing these operations, the system first identifies the mark CAM entry 702 pointed to by the last pointer associated with the previous phase of operation (step 904). Starting from the identified mark CAM entry 702, the system traverses the sequence of mark CAM entries 702 placed in mark CAM 700 during the previous phase of operation. While traversing the sequence, the system uses the prev pointers 706 in each mark CAM entry 702 in the sequence to determine the next mark CAM entry 702 in the sequence.

For each mark CAM entry 702 in the traversed sequence, the system determines if the entry's phase 708 indicator matches the previous phase of operation (step 906). If so, the system uses the DW_mask 710 in the mark CAM entry 702 to complete a store from the store queue (step 908). When completing the stores in the store queue, the system: (1) gathers up all stores to the cache line from the store queue according to the bits asserted in DW_mask 710 for the associated mark CAM entry 702; (2) applies the gathered stores to the corresponding portions of the cache line; and removes the stores from the store queue. The system also removes the load-mark and/or store-mark (for the cache line at the address in the key 704 of the mark CAM entry 702) from the corresponding cache line (step 910). When steps 908 and 910 are complete, the system removes the mark CAM entry 702 from mark CAM 700 (step 912).

However, if the system determines that the mark CAM entry 702's phase 708 indicator equals the current phase of operation (step 906) (as can happen if the cache line is load-marked or store-marked in the current phase of operation before the mark CAM entry 702 is removed from mark CAM 700), the system leaves the mark CAM entry 702 in mark CAM 700 (step 914). The system also places the mark CAM entry 702 in the sequence of entries for the current phase of operation (step 916) by setting the mark CAM entry 702's prev pointer to the value of the thread's last pointer and setting the thread's last pointer to point to that entry in mark CAM 700.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for handling load-marked and store-marked cache lines, comprising:
upon asserting a load-mark or a store-mark for a cache line during a first phase of operation, adding a new entry to a private buffer for a thread and in doing so using an address of the cache line as a key for the entry in the private buffer, wherein adding the entry to the private buffer involves
setting a phase indicator in the entry in the private buffer to indicate the first phase of operation,
if the entry is a first entry in the private buffer for the first phase of operation, updating a prey pointer in the entry to null, otherwise, updating the prey pointer in the entry to point to an entry in the private buffer pointed to by a last pointer for the first phase of operation, and
updating the last pointer for the first phase of operation to point to the entry in the private buffer.

2. The method of claim 1, wherein upon asserting a store-mark in metadata associated with the cache line, the method further comprises updating a bit mask in the entry to indicate a portion of the cache line being stored to by a corresponding store operation that is buffered into a store queue.

3. The method of claim 2, wherein upon completing the first phase of operation and commencing a second phase of operation, the method further comprises:
upon marking a cache line by asserting a store-mark in metadata associated with the cache line during the second phase of operation, adding an entry to the private buffer and in doing so using an address of the cache line as the key for the entry in the private buffer;
wherein adding the entry to the private buffer involves setting the phase indicator in the entry in the private buffer to indicate the second phase of operation;
wherein, if the entry is newly added to the private buffer, adding the entry to the private buffer involves, if the entry is the first entry in the private buffer for the second phase of operation, setting the prey pointer in the entry to null, otherwise, setting the prey pointer in the entry to point to an entry in the private buffer pointed to by a last pointer for the second phase of operation and setting the last pointer associated with the second phase of operation to point to the entry in the private buffer.

4. The method of claim 2, wherein the method further comprises recording a type of mark asserted for the cache line in a mark-type field in the entry.

5. The method of claim 4, wherein upon completing the first phase of operation and commencing a second phase of operation, the method further comprises:
upon marking a cache line by asserting a load-mark or a store-mark in metadata associated with the cache line during the second phase of operation, adding an entry to the private buffer and in doing so using an address of the cache line as the key for the entry in the private buffer;
wherein adding the entry to the private buffer involves setting the phase indicator in the entry in the private buffer to indicate the second phase of operation;
wherein, if the entry is newly added to the private buffer, adding the entry to the private buffer involves, if the entry is the first entry in the private buffer for the second phase of operation, setting the prey pointer in the entry to null, otherwise, setting the prey pointer in the entry to point to an entry in the private buffer pointed to by a last pointer for the second phase of operation and setting the last pointer associated with the second phase of operation to point to the entry in the private buffer.

6. The method of claim 5, wherein upon completing the first phase of operation and commencing the second phase of operation, the method further comprises:
starting at the entry in the private buffer indicated by the last pointer associated with the first phase of operation, using the prey pointer in each entry to traverse through a sequence of entries added to the private buffer during the first phase of operation;
while traversing the sequence of entries, determining if the phase indicator for each entry indicates the first phase of operation; and
if so, removing the entry from the private buffer;
otherwise, adding the entry to a sequence of entries associated with the second phase of operation.

7. The method of claim 6, wherein adding the entry to the sequence of entries associated with the second phase of operation involves:
if the entry is a first entry in the private buffer for the second phase of operation, setting a prey pointer in the entry to null, otherwise, setting the prey pointer in the entry to point to a entry in the private buffer pointed to by a last pointer for the second phase of operation; and
updating the last pointer for the second phase of operation to point to the entry in the private buffer.

8. The method of claim 6, wherein removing each entry from the private buffer involves:
removing any load-mark and store-mark from the associated cache line; and
deleting the entry from the private buffer.

9. The method of claim 8, wherein while removing a store-mark from a cache line, the method further comprises using the bit mask associated with the entry in the private buffer to identify portions of an entry in a store queue that are to be stored to the cache line and using the identified portions to complete the store from the store queue to the cache line.

10. The method of claim 1, wherein the private buffer is organized as a content-addressable memory (CAM).

11. An apparatus for handling load-marked and store-marked cache lines, comprising:
a processor;
an execution mechanism on the processor;
wherein upon asserting a load-mark or a store-mark for a cache line during a first phase of operation, the execution mechanism is configured to add a new entry to a private buffer for a thread and in doing so use an address of the cache line as a key for the entry in the private buffer, wherein when adding the entry to the private buffer, the execution mechanism is configured to
set a phase indicator in the entry in the private buffer to indicate the first phase of operation,
if the entry is a first entry in the private buffer for the first phase of operation, update a prey pointer in the entry to null, otherwise, update the prey pointer in the entry to point to an entry in the private buffer pointed to by a last pointer for the first phase of operation, and
update the last pointer for the first phase of operation to point to the entry in the private buffer.

12. The apparatus of claim 11, wherein upon asserting a store-mark in metadata associated with the cache line, the execution mechanism is configured to update a bit mask in the entry to indicate a portion of the cache line being stored to by a corresponding store operation that is buffered into a store queue.

13. The apparatus of claim 12, wherein upon completing the first phase of operation and commencing a second phase of operation, the execution mechanism is configured to:
  upon marking a cache line by asserting a store-mark in metadata associated with the cache line during the second phase of operation, add an entry to the private buffer and in doing so use an address of the cache line as the key for the entry in the private buffer;
  set the phase indicator in the entry in the private buffer to indicate the second phase of operation;
  if the entry is newly added to the private buffer and if the entry is the first entry in the private buffer for the second phase of operation, set the prey pointer in the entry to null, otherwise, if the entry is not the first entry in the private buffer for the second phase of operation, set the prey pointer in the entry to point to an entry in the private buffer pointed to by a last pointer for the second phase of operation; and
  set the last pointer associated with the second phase of operation to point to the entry in the private buffer.

14. The apparatus of claim 12, wherein the execution mechanism is configured to record a type of mark asserted for the cache line in a mark-type field in the entry.

15. The apparatus of claim 14, wherein upon completing the first phase of operation and commencing a second phase of operation, the execution mechanism is configured to:
  upon marking a cache line by asserting a load-mark or a store-mark in metadata associated with the cache line during the second phase of operation, add an entry to the private buffer and in doing so use an address of the cache line as the key for the entry in the private buffer;
  set the phase indicator in the entry in the private buffer to indicate the second phase of operation;
  if the entry is newly added to the private buffer and if the entry is the first entry in the private buffer for the second phase of operation, set the prey pointer in the entry to null, otherwise, if the entry is not the first entry in the private buffer for the second phase of operation, set the prey pointer in the entry to point to an entry in the private buffer pointed to by a last pointer for the second phase of operation; and
  set the last pointer associated with the second phase of operation to point to the entry in the private buffer.

16. The apparatus of claim 15, wherein upon completing the first phase of operation and commencing the second phase of operation, the execution mechanism is configured to:
  start at the entry in the private buffer indicated by the last pointer associated with the first phase of operation and use the prey pointer in each entry to traverse through a sequence of entries added to the private buffer during the first phase of operation;
  while traversing the sequence of entries, determine if the phase indicator for each entry indicates the first phase of operation; and
  if so, remove the entry from the private buffer;
  otherwise, add the entry to a sequence of entries associated with the second phase of operation.

17. The apparatus of claim 16, wherein when adding the entry to the sequence of entries associated with the second phase of operation, the execution mechanism is configured to:
  if the entry is a first entry in the private buffer for the second phase of operation, set a prey pointer in the entry to null, otherwise, set the prey pointer in the entry to point to a entry in the private buffer pointed to by a last pointer for the second phase of operation; and
  update the last pointer for the second phase of operation to point to the entry in the private buffer.

18. The apparatus of claim 16, wherein when removing each entry from the private buffer, the execution mechanism is configured to:
  remove any load-mark or store-mark from the associated cache line; and
  delete the entry from the private buffer.

19. The apparatus of claim 18, wherein while removing a store-mark from a cache line, the execution mechanism is configured to:
  use the bit mask associated with the entry in the private buffer to identify portions of an entry in a store queue that are to be stored to the cache line; and
  use the identified portions to complete the store from the store queue to the cache line.

20. The apparatus of claim 11, wherein the private buffer is organized as a content-addressable memory (CAM).

21. A private buffer for a thread, wherein the private buffer includes a number of entries for recording when load-marks or store-marks are placed on a cache lines, comprising:
  a key field for each entry, wherein the key field is used to address the entry, and wherein the entries are addressed using a cache line address of an associated load-marked or store-marked cache line;
  a prey pointer in each entry, wherein the prey pointer is used to keep track of an entry that was placed in the private buffer before the entry;
  a last pointer in the private buffer for each phase of operation, wherein the last pointers point to an entry that was most recently added for the associated phase of operation or to null if no entries have been made for the associated phase; and
  a phase indicator field in each entry, wherein the phase indicator field includes a value that indicates a phase of operation that is current when the entry was placed in the private buffer.

22. The private buffer of claim 21, wherein the private buffer comprises a bit mask field in each entry, wherein one or more bits in the bit mask are asserted to indicate when a store to a corresponding portion of the store-marked cache line is present in the store buffer.

23. The private buffer of claim 22, wherein the private buffer comprises a mark-type field in each entry, wherein the mark-type field includes a value that indicates what type of mark or marks have been placed on the cache line.

* * * * *